(12) United States Patent
Sakaguchi

(10) Patent No.: US 11,904,839 B2
(45) Date of Patent: Feb. 20, 2024

(54) VEHICLE CONTROL DEVICE, VEHICLE, VEHICLE CONTROL METHOD, AND STORAGE MEDIUM STORING CONTROL PROGRAM

(71) Applicant: TOYOTA JIDOSHA KABUSHIKI KAISHA, Toyota (JP)

(72) Inventor: Tomokazu Sakaguchi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/695,082

(22) Filed: Mar. 15, 2022

(65) Prior Publication Data

US 2022/0306084 A1    Sep. 29, 2022

(30) Foreign Application Priority Data

Mar. 26, 2021   (JP) .................................. 2021-054245

(51) Int. Cl.
| | | |
|---|---|---|
| *B60W 20/50* | (2016.01) | |
| *B60W 50/035* | (2012.01) | |
| *B60W 60/00* | (2020.01) | |
| *G07C 5/00* | (2006.01) | |

(52) U.S. Cl.
CPC .......... *B60W 20/50* (2013.01); *B60W 50/035* (2013.01); *B60W 60/0053* (2020.02); *G07C 5/008* (2013.01); *B60W 2510/242* (2013.01); *B60W 2710/20* (2013.01); *B60W 2720/10* (2013.01)

(58) Field of Classification Search
CPC ............... B60W 20/50; B60W 50/035; B60W 60/0053; B60W 2510/242; B60W 2710/20; B60W 2720/10; B60W 50/0205; B60W 50/038; G07C 5/008
See application file for complete search history.

(56) References Cited

U.S. PATENT DOCUMENTS

| | | | |
|---|---|---|---|
| 10,899,340 B1* | 1/2021 | Hitzinger | B60W 30/02 |
| 2004/0061375 A1* | 4/2004 | Drott | B60T 7/042 |
| | | | 303/20 |
| 2005/0099061 A1* | 5/2005 | Hollandsworth | B60T 17/04 |
| | | | 303/7 |
| 2009/0206660 A1 | 8/2009 | Makita et al. | |

(Continued)

FOREIGN PATENT DOCUMENTS

| | | |
|---|---|---|
| JP | 2007-307931 A | 11/2007 |
| JP | 2011-240816 A | 12/2011 |

(Continued)

*Primary Examiner* — Jaime Figueroa
*Assistant Examiner* — Madison B Emmett
(74) *Attorney, Agent, or Firm* — Oliff PLC

(57) ABSTRACT

A vehicle control device include a processor. The processor is configured to monitor a primary power source and a secondary power source for anomalies, the primary power source and the secondary power source supplying electrical power to a plurality of drive devices configured to control deceleration and steering of a vehicle, and in a case in which an anomaly has been detected in at least one of the primary power source or the secondary power source as a result of the monitoring, control the vehicle by supplying electrical power to a drive device having a lower electrical power consumption amount among the plurality of drive devices.

9 Claims, 16 Drawing Sheets

(56) References Cited

U.S. PATENT DOCUMENTS

| | | | |
|---|---|---|---|
| 2010/0292881 A1* | 11/2010 | Takahashi | B60W 20/50 701/22 |
| 2011/0066331 A1* | 3/2011 | Yamashita | B62D 5/0481 701/42 |
| 2013/0015024 A1* | 1/2013 | Vuckovic | B60T 15/36 188/170 |
| 2013/0025974 A1* | 1/2013 | Piech | B66B 5/02 187/289 |
| 2016/0264003 A1 | 9/2016 | Yokoyama et al. | |
| 2020/0039527 A1* | 2/2020 | Hase | B60L 50/16 |
| 2023/0011375 A1* | 1/2023 | Hecht | B66B 5/18 |

FOREIGN PATENT DOCUMENTS

| | | |
|---|---|---|
| JP | 2013-99166 A | 5/2013 |
| JP | 2015-93560 A | 5/2015 |
| JP | 2018-176800 A | 11/2018 |

* cited by examiner

VEHICLE CONTROL DEVICE, VEHICLE, VEHICLE CONTROL METHOD, AND STORAGE MEDIUM STORING CONTROL PROGRAM

CROSS-REFERENCE TO RELATED APPLICATION

This application is based on and claims priority under 35 USC 119 from Japanese Patent Application No. 2021-054245 filed on Mar. 26, 2021, the disclosure of which is incorporated by reference herein.

BACKGROUND

Technical Field

The present disclosure relates to a vehicle control device, a vehicle, a vehicle control method and a storage medium storing a control program.

Related Art

Japanese Patent Application Laid-Open (JP-A) No. 2018-176800 discloses an autonomous driving control device that can reduce anxiety on the part of an occupant when autonomous driving is continued at a time at which the vehicle's power system is abnormal.

In this autonomous driving control device, when an anomaly in the power system has been detected, together with executing fail operation control related to autonomous driving control, the fail operation control is modified in accordance with the nature of the anomaly in the power system.

In the autonomous driving control device of JP-A No. 2018-176800, depending on the nature of the anomaly in the power system, there is the risk that it may not be possible to secure the power required to travel on a modified travel route.

SUMMARY

The present disclosure aims to provide a vehicle control device, a vehicle, a vehicle control method, and a storage medium storing a control program capable of securing electrical power for safely pulling a vehicle over even in a case in which at least one of the power sources fails in a vehicle provided with plural power sources.

A first aspect is a vehicle control device, including: a monitoring unit that monitors a primary power source and a secondary power source for anomalies, the primary power source and the secondary power source supplying electrical power to plural drive devices configured to control deceleration and steering of a vehicle; and a control unit that, in a case in which the monitoring unit has detected an anomaly in at least one of the primary power source or the secondary power source, controls the vehicle by supplying electrical power to a drive device having a lower electrical power consumption amount among the plural drive devices.

The vehicle control device of the first aspect is applied in a case of controlling a vehicle equipped with plural drive devices capable of controlling deceleration and steering, and with a primary power source and a secondary power source for supplying electrical power to these drive devices. Examples of drive devices that can control deceleration include various devices related to electronically-controlled braking systems, regenerative braking of hybrid electric vehicles or electric vehicles, and engine braking. Examples of drive devices that can control steering include various devices related to electric power steering and vehicle stability control (VSC).

In the vehicle control device, the monitoring unit monitors for anomalies in the primary power source and the secondary power source and, at the same time, in a case in which the control unit has detected an anomaly in at least one of the primary power source or the secondary power source, the control unit controls the vehicle by supplying electrical power to drive devices having lower power consumption amounts among the plural drive devices. Here, examples of a "power source anomaly" include a power failure, a power drop, voltage instability, and a wiring failure. According to the vehicle control device, it is possible to secure electrical power for safely pulling the vehicle over even in a case in which at least one of the power sources fails in a vehicle provided with plural power sources.

The vehicle control device of the second aspect is the vehicle control device of the first aspect, which further includes an estimation unit that estimates a stopping target for the vehicle, and in which the control unit controls the vehicle by switching to a drive device having a higher electrical power consumption amount in a case in which steering power and braking power are insufficient for stopping at the stopping target during control of the vehicle by the drive device having a lower electrical power consumption amount.

In the vehicle control device of the second aspect, the control unit controls the vehicle by switching to a drive devices having higher electrical power consumption amounts in a case in which the steering force and braking force for stopping at the stopping target estimated by the estimation unit are insufficient while the vehicle is being controlled by drive devices having lower electrical power consumption amounts. Therefore, according to the vehicle control device, in a case in which the steering force and braking force from drive devices having lower electrical power consumption amounts are insufficient, by switching to drive devices having higher electrical power consumption amounts, it is possible to secure the steering force and braking force for stopping at the stopping target.

The vehicle control device of the third aspect is the vehicle control device of the first or second aspect, in which the control unit controls the vehicle by switching a drive device of a steering system to a drive device having a higher electrical power consumption amount in a case in which a velocity of the vehicle has fallen below a predetermined value.

A larger steering force is required as the speed of the vehicle decreases, and according to the vehicle control device of the third aspect, it is possible to secure the steering force in a case in which the speed of the vehicle falls below a predetermined value.

The vehicle control device of the fourth aspect is the vehicle control device of any one of the first to third aspects, which further includes a guidance unit that performs guidance of the vehicle with respect to a driver of the vehicle in a case in which the control unit is controlling the vehicle by means of the drive device having a lower electrical power consumption amount.

In the vehicle control device of the fourth aspect, in a case in which the vehicle is being controlled by the drive devices having lower electrical power consumption amounts, the guidance unit provides the driver with vehicle guidance. According to this vehicle control device, even in a case in which the steering force and braking force are insufficient, it is possible to guide the driver driving the vehicle along a safe pull-over travel path.

The fifth aspect is a vehicle including the vehicle control device of any one of the first to fourth aspects, including the control unit capable of controlling autonomous driving of the vehicle, the primary power source, the secondary power source, and the plural drive devices.

According to the vehicle of the fifth aspect, even in a case in which at least one of the power sources fails, it is possible to secure electrical power for safely pulling the vehicle over.

A sixth aspect is method of controlling a vehicle by which a computer executes processing to control a vehicle, the processing including: monitoring a primary power source and a secondary power source for anomalies, the primary power source and the secondary power source supplying electrical power to plural drive devices configured to control deceleration and steering of the vehicle; and in a case in which an anomaly has been detected in at least one of the primary power source or the secondary power source, controlling the vehicle by supplying electrical power to a drive device having a lower electrical power consumption amount among the plural drive devices.

The vehicle control method of the sixth aspect is a method of controlling a vehicle equipped with plural drive devices capable of controlling deceleration and steering, and with a primary power source and a secondary power source for supplying electrical power to these drive devices. Drive devices capable of controlling deceleration and drive devices capable of controlling steering are as described above.

In the vehicle control method, a computer monitors the primary power source and the secondary power source for anomalies, and at the same time, in a case in which an anomaly has been detected in at least one of the primary power source or the secondary power source, controls the vehicle by supplying electrical power to drive devices having lower power consumption amounts among the plural drive devices. According to the vehicle control method, it is possible to secure electrical power for safely pulling the vehicle over even in a case in which at least one of the power sources fails in a vehicle provided with plural power sources.

A seventh aspect is a non-transitory recording medium on which a control program is stored. The program is executable by a computer to perform processing including: monitoring a primary power source and a secondary power source for anomalies, the primary power source and the secondary power source supplying electrical power to plural drive devices configured to control deceleration and steering of the vehicle; and in a case in which an anomaly has been detected in at least one of the primary power source or the secondary power source, controlling the vehicle by supplying electrical power to a drive device having a lower electrical power consumption amount among the plural drive devices.

The control program of the seventh aspect controls a vehicle equipped with plural drive devices capable of controlling deceleration and steering, and with a primary power source and a secondary power source for supplying electrical power to these drive devices. Drive devices capable of controlling deceleration and drive devices capable of controlling steering are as described above.

When the control program is executed, a computer monitors the primary power source and the secondary power source for anomalies, and at the same time, in a case in which an anomaly has been detected in at least one of the primary power source or the secondary power source, controls the vehicle by supplying electrical power to drive devices having lower power consumption amounts among the plural drive devices. According to the control program, it is possible to secure electrical power for safely pulling the vehicle over even in a case in which at least one of the power sources fails in a vehicle provided with plural power sources.

According to the present disclosure, it is possible to secure electrical power for safely pulling the vehicle over even in a case in which at least one of the power sources fails in a vehicle provided with plural power sources.

BRIEF DESCRIPTION OF THE DRAWINGS

Exemplary embodiments of the present disclosure will be described in detail based on the following figures, wherein.

DETAILED DESCRIPTION

Detailed explanation follows regarding an example of an exemplary embodiment of the present disclosure, with reference to the drawings.

First Embodiment

Figure 1:
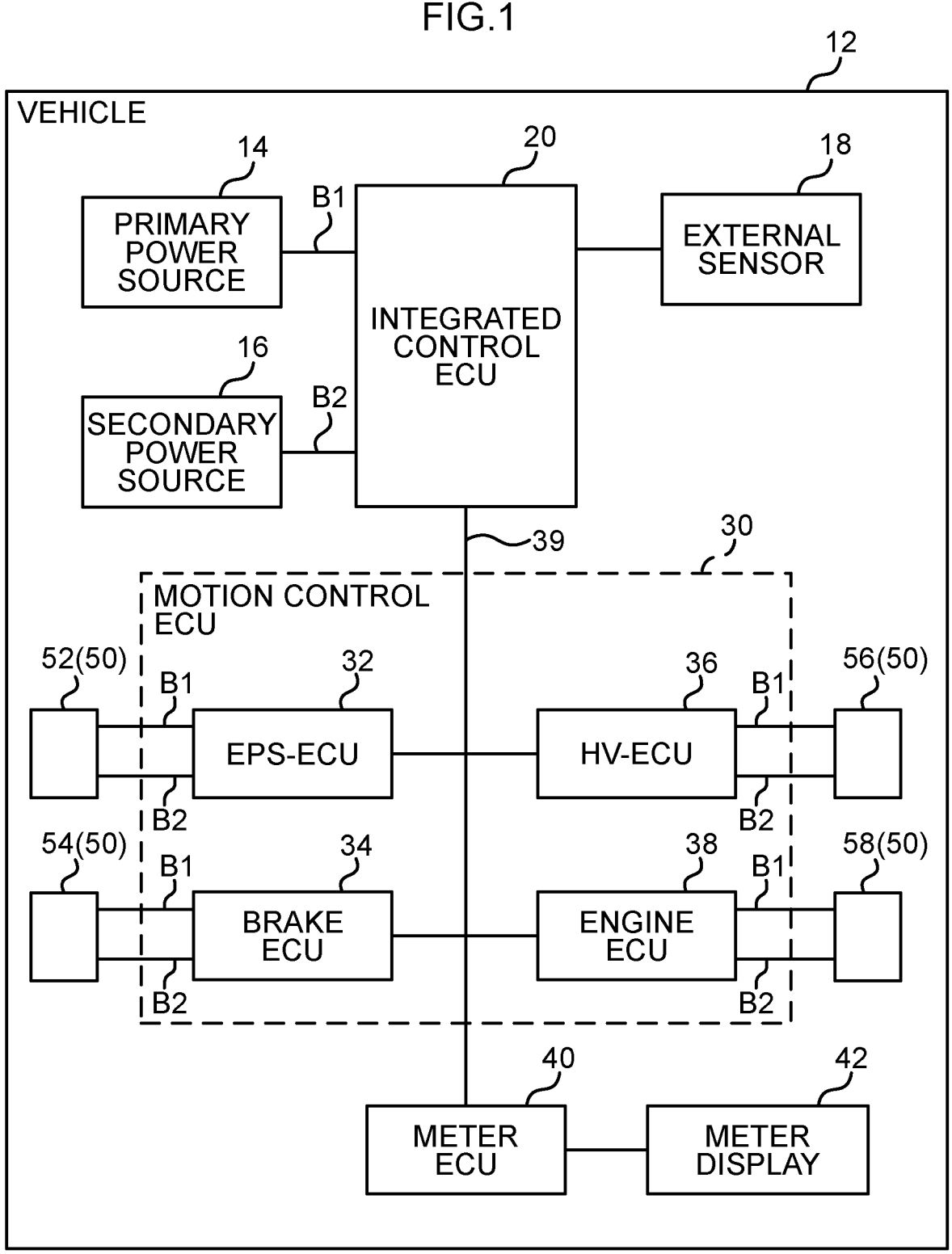
FIG. 1 is a schematic configuration view of a vehicle according to a first embodiment.

Vehicle 12 of the first embodiment is a hybrid electric vehicle (HEV). As shown in FIG. 1, the vehicle 12 of the present embodiment includes plural power sources that are a primary power source 14 and a secondary power source 16, and each drive device 50 that controls the travel of the vehicle 12 is driven by the electrical power of the primary power source 14 and the secondary power source 16.

The primary power source 14 and the secondary power source 16 are each batteries for temporarily storing electrical power. They are configured, for example, by a rechargeable secondary battery such as a lithium battery or a nickel hydrogen battery.

The vehicle 12 includes an external sensor 18, an integrated control electronic control unit (ECU) 20, and a motion control ECU 30 in addition to the primary power source 14 and the secondary power source 16. The primary power source 14 and the integrated control ECU 20 are connected via a primary power source circuit B1. Further, the secondary power source 16 and the integrated control ECU 20 are connected via a secondary power source circuit B2. In a case in which the voltage of the primary power source 14 and the operating voltage of the respective drive devices 50 are different, a DCDC converter is provided at the primary power source circuit B1. Similarly, in a case in which the voltage of the secondary power source 16 and the operating voltage of the respective drive devices 50 are different, a DCDC converter is provided at the secondary power source circuit B2.

The motion control ECU 30 includes an electric power steering (EPS) ECU 32, a brake ECU 34, an HV-ECU 36, and an engine ECU 38. Each motion control ECU 30 is connected to the primary power source circuit B1 and the secondary power source circuit B2, respectively. Further, each motion control ECU 30 is connected to the integrated control ECU 20 via an external bus 39.

The EPS-ECU 32 controls electric power steering driven by the primary power source 14 and the secondary power source 16. That is, the EPS-ECU 32 controls a motor 52, which is the drive device 50 for the electric power steering, to perform steering of the vehicle 12.

The brake ECU 34 controls an electronically-controlled brake system and vehicle stability control (VSC) driven by the primary power source 14 and the secondary power source 16. Specifically, the brake ECU 34 controls a brake actuator 54, which is the drive device 50 configuring the electronically-controlled brake system, to cause the vehicle 12 to decelerate. Further, the brake ECU 34 controls a brake actuator 54 configuring the VSC to cause the vehicle 12 to decelerate.

The HV-ECU 36 controls a drive device 56, which is a drive device 50 driven by the primary power source 14 and the secondary power source 16. Examples of the drive device 56 include a power control unit and a motor. The HV-ECU 36 controls the power control unit and the motor as the drive device 56 so as to apply regenerative braking and thereby cause the vehicle 12 to decelerate.

The engine ECU 38 controls the engine by means of the primary power source 14 and the secondary power source 16. Specifically, the engine ECU 38 controls an electronic throttle 58, which is the drive device 50 for the engine, to cause the vehicle 12 to decelerate.

The external sensor 18 includes, for example, a camera that images a predetermined range, a millimeter-wave radar that transmits a search wave across a predetermined range and receives a reflected wave, and a laser imaging detection and ranging (LIDAR) scanner that scans a predetermined range.

The motion control ECU 30 of the present embodiment has a function of controlling autonomous driving of the vehicle 12, and by acquiring information about the periphery of the vehicle 12 from the external sensor 18, performs autonomous driving of the vehicle 12 under given conditions.

Further, the vehicle 12 is provided with a meter ECU 40 and a meter display 42. The meter ECU 40 controls the meter display 42, which is a display unit. The meter ECU 40 is connected to the integrated control ECU 20 via the external bus 39, and information transmitted from the integrated control ECU 20 can be displayed at the meter display 42.

The meter display 42 is a liquid crystal display provided in order to display information such as the speed of the vehicle 12, the state of the vehicle 12, and the direction of travel.

Figure 2:
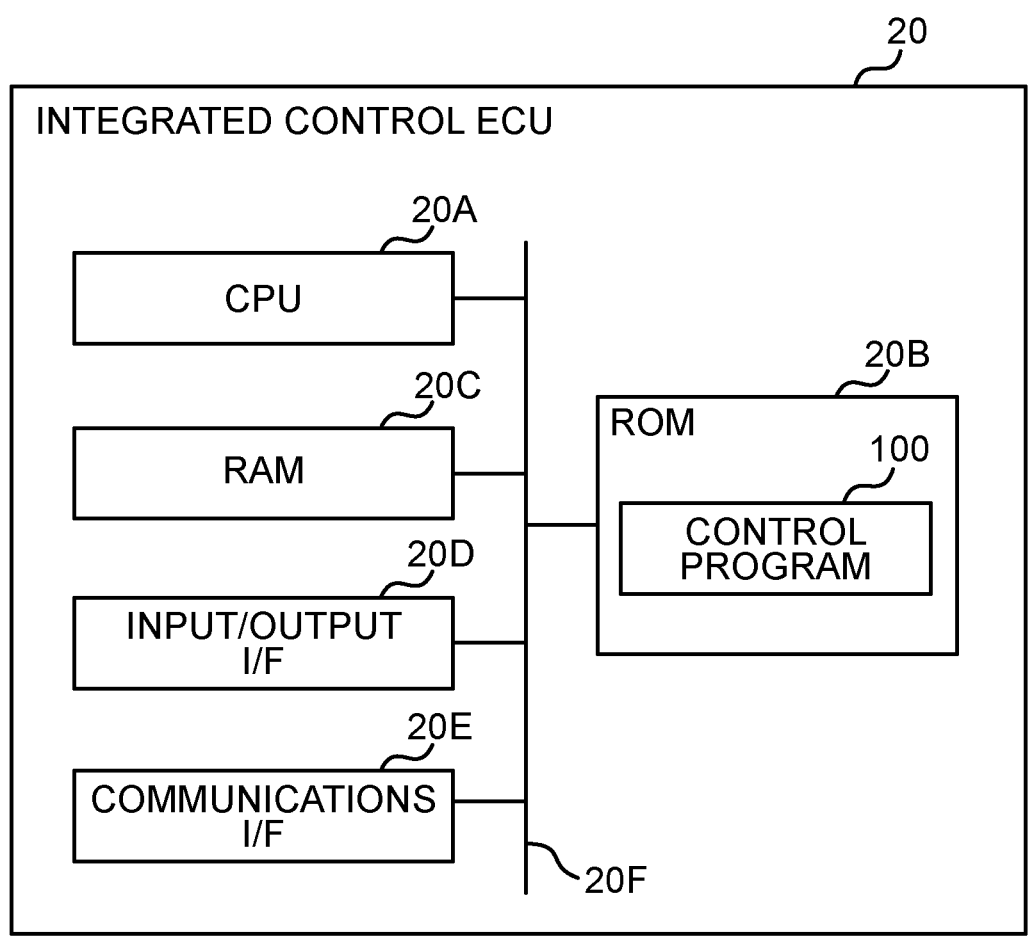
FIG. 2 is a block diagram showing a hardware configuration of an integrated control ECU of the first embodiment.

As shown in FIG. 2, the integrated control ECU 20 includes a central processing unit (CPU) 20A, a read-only memory (ROM) 20B, a random access memory (RAM) 20C, an input/output interface (I/F) 20D, and a communications I/F 20E. The CPU 20A, ROM 20B, RAM 20C, input/output I/F 20D and communications I/F 20E are communicably connected to each other via an internal bus 20F.

The CPU 20A is a central computation processing unit that executes various programs and controls the respective units. Namely, the CPU 20A reads a program from the ROM 20B, and executes the program employing the RAM 20C as a workspace.

The ROM 20B stores various programs and various data. A control program 100 is stored in the ROM 20B of the present embodiment. The control program 100 is a program for controlling the integrated control ECU 20.

The RAM 20C serves as a workspace for temporary storage of programs and data.

The input/output I/F 20D is an interface for communicating with the external sensor 18.

The communications I/F 20E is an interface for communication with each motion control ECU 30 and the meter ECU 40. For the interface, a communication standard based on the CAN protocol is used, for example.

The integrated control ECU 20 may include a storage as a storage unit in addition to, or in place of, the ROM 20B. This storage is configured, for example, by a hard disk drive (HDD) or a solid state drive (SSD).

Figure 3:
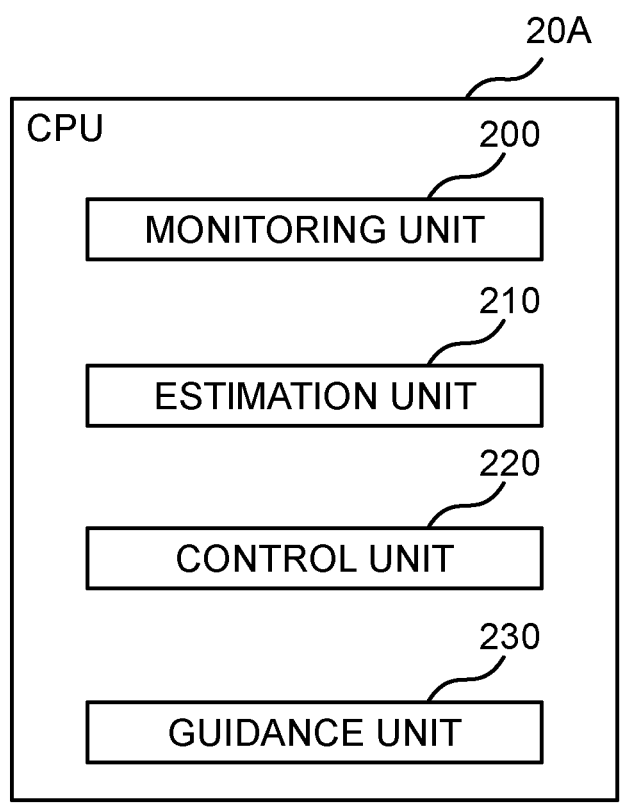
FIG. 3 is a block diagram showing a functional configuration of a CPU in the integrated control ECU of the first embodiment.

As shown in FIG. 3, in the integrated control ECU 20 of the present embodiment, by executing the control program 100, the CPU 20A functions as a monitoring unit 200, an estimation unit 210, a control unit 220, and a guidance unit 230.

The monitoring unit 200 has a function of monitoring anomalies in the primary power source 14 and the secondary power source 16. Examples of a "power source anomaly" include power failure, power reduction, voltage instability, and failure of the primary power source circuit B1 and the secondary power source circuit B2 at the primary power source 14 and the secondary power source 16. For example, the monitoring unit 200 acquires the voltage of the respective batteries of the primary power source 14 and the secondary power source 16, and monitors for anomalies by performing self-diagnosis.

In a case in which the vehicle 12 is pulled over by the pull-over processing described below, the estimation unit 210 has a function of estimating a target position that is a stopping target for the vehicle 12.

In a case in which the monitoring unit 200 detects an anomaly in at least one of the primary power source 14 or the secondary power source 16, the control unit 220 has a function of controlling the vehicle 12 by supplying electrical power to drive devices 50 having lower power consumption amounts among the plural drive devices 50. In addition, in a case in which the steering force and braking force for stopping at the target position are insufficient, the control unit 220 controls the vehicle 12 by means of drive devices 50 having higher power consumption amounts among the plural drive devices 50. Further, in a case in which the speed of the vehicle 12 has fallen below a predetermined value, the control unit 220 controls the vehicle 12 by switching the driving device 50 of the steering system to a driving device 50 having a higher power consumption amount.

Further, the control unit 220 has a function of switching between autonomous driving and manual driving of the vehicle 12 by issuing an instruction to the motion control ECU 30.

Here, in the vehicle 12 of the present embodiment, deceleration and steering control in a case of pulling over are categorized according to a main function and a sub-function. The main functions are realized by the drive devices 50 having the higher power consumption amounts, and as shown in Table 1, are functions directly realized by respective drive devices 50, such as deceleration by the electronically-controlled brake system and steering by electric power steering. The sub-functions are realized by the drive devices 50 having the lower power consumption amounts and, as shown in Table 1, are functions incidentally realized by respective drive devices 50, such as deceleration by regenerative braking or engine braking, and steering by VSC.

Table 1 shows relationships of correspondence between braking and steering of the vehicle 12 and the main functions and the sub-functions realized by the respective motion control ECUs 30.

Figure 4:
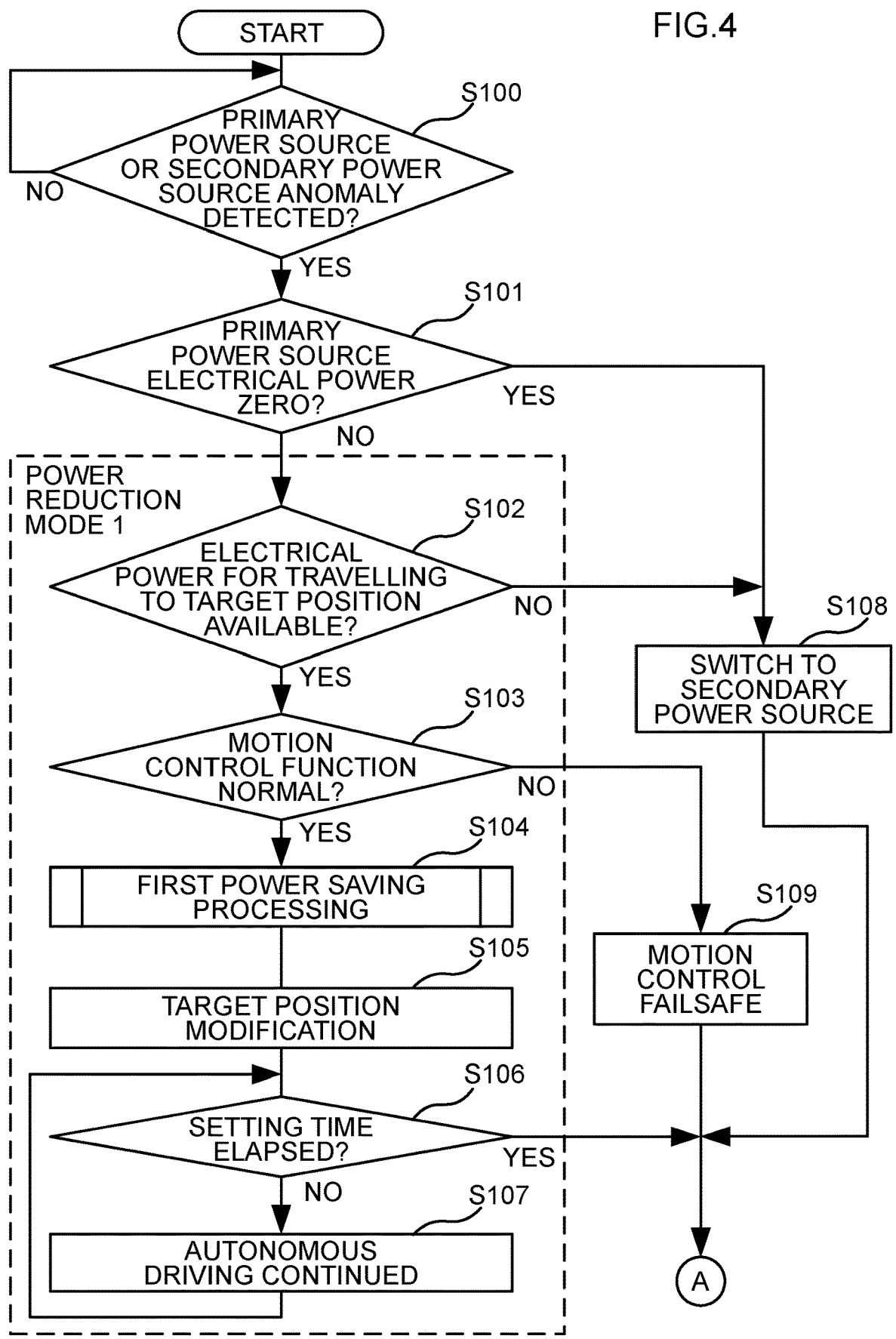
FIG. 4 is a flowchart showing the flow of pull-over processing in the first embodiment.

In step S100 of FIG. 4, the CPU 20A performs a determination as to whether or not an anomaly has been detected in the primary power source 14 and/or the secondary power source 16. The CPU 20A proceeds to step S101 in a case in which it is determined that an anomaly has been detected in the primary power source 14 and/or the secondary power source 16 (the case of YES in step S100). However, the CPU 20A repeats step S100 in a case in which it is determined that an anomaly has not been detected in the primary power source 14 and/or the secondary power source 16 (the case of NO in step S100).

In step S101, the CPU 20A performs a determination as to whether or not the power of the primary power source 14 is zero. The CPU 20A proceeds to step S108 in a case in which it is determined that the power of the primary power source 14 is zero (the case of YES in step S101). However, the CPU 20A proceeds to step S102 in a case in which it is determined that the power of the primary power source 14 is not zero (the case of NO in step S101).

Here, from step S102 to step S107, the processing is executed as "power reduction mode 1".

In step S102, the CPU 20A performs a determination as to whether or not electrical power for traveling to the target position is available. The CPU 20A proceeds to step S103 in a case in which it is determined that there is power available to travel to the target position (the case of YES in step S102). However, the CPU 20A proceeds to step S108 in a case in which it is determined that there is not power available to travel to the target position (the case of NO in step S102).

In step S103, the CPU 20A performs a determination as to whether or not the motion control function is normal. The CPU 20A proceeds to step S104 in a case in which it is determined that the motion control function is normal (the

TABLE 1

| Motion control ECU<br>Vehicle function | EPS-ECU<br>Electric power steering | VSC | Brake ECU | | |
| --- | --- | --- | --- | --- | --- |
| | | | Electronically-controlled brake system | HV-ECU<br>Regenerative braking | Engine ECU<br>Engine braking |
| Braking | — | — | Main function | Sub-function | Sub-function |
| Steering | Main function | Sub-function | — | — | — |

In a case in which the control unit 220 controls the vehicle 12 by means of the drive devices 50 having the lower power consumption amounts—in other words, in a case in which the vehicle 12 is controlled by the sub-functions—the guidance unit 230 has a function of guiding the vehicle 12 by providing guidance to a driver of the vehicle 12.

(Control Flow)

The flow of the pull-over processing executed at the integrated control ECU 20 of the present embodiment is described with reference to the flowcharts of FIGS. 4 and 5. This pull-over processing is realized by the CPU 20A functioning as the monitoring unit 200, the estimation unit 210, the control unit 220, and the guidance unit 230 described above.

The CPU 20A constantly executes processing for detecting anomalies in the primary power source 14 and the secondary power source 16, and the voltages of the primary power source 14 and the secondary power source 16 are monitored. In the present embodiment, examples are shown mainly of cases in which an anomaly has occurred in the primary power source 14 while the vehicle 12 is traveling by autonomous driving.

case of YES in step S103). However, the CPU 20A proceeds to step S109 in a case in which it is determined that the motion control function is not normal (the case of NO in step S103).

In step S104, the CPU 20A executes first power saving processing. Details of the first power saving processing are described below.

In step S105, the CPU 20A changes the target position of the vehicle 12. Specifically, based on the electrical power amounts of the primary power source 14 and the secondary power source 16 and the information regarding the periphery of the vehicle 12 detected by the external sensor 18, the CPU 20A determines a new target position for the vehicle 12.

In step S106, the CPU 20A performs a determination as to whether or not a setting time has elapsed. This setting time is a notification period required for changing the control of the vehicle 12 to manual driving during autonomous driving and transferring control to the driver. The CPU 20A proceeds to step S110 of FIG. 5 via the reference symbol A in a case in which it is determined that the setting time has elapsed (the case of YES in step S106). However, the CPU 20A proceeds to step S107 in a case in which it is determined that the setting time has not elapsed (the case of NO in step S106).

In step S107, the CPU 20A continues the autonomous driving of the vehicle 12. Then, the processing returns to step S106.

In step S108, the CPU 20A executes switching to the secondary power source 16. Then, the processing proceeds to step S110 of FIG. 5 via the reference symbol A.

In step S109, the CPU 20A executes a fail-safe for motion control of the vehicle 12. Then, the processing proceeds to step S110 of FIG. 5 via the reference symbol A.

Figure 5:
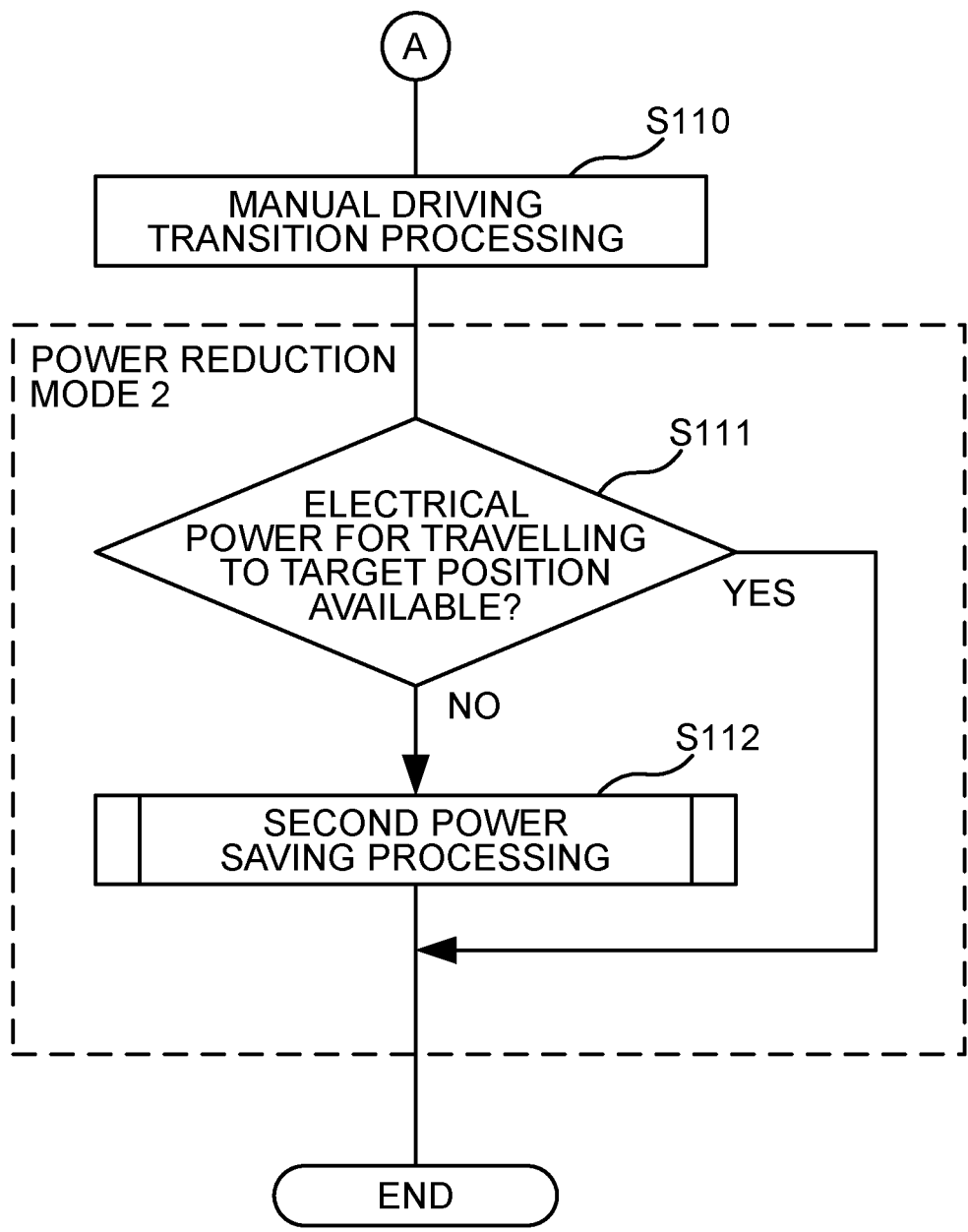
FIG. 5 is a flowchart (the continuation of FIG. 4) showing the flow of the pull-over processing in the first embodiment.

In step S110 of FIG. 5, the CPU 20A executes transition processing to manual operation.

Here, from step S111 to step S112, the processing is executed as "power reduction mode 2".

In step S111, the CPU 20A performs a determination as to whether or not electrical power for traveling to the target position is available. The CPU 20A ends the pull-over processing in a case in which it is determined that there is power available to travel to the target position (the case of YES in step S111). However, the CPU 20A proceeds to step S112 in a case in which it is determined that there is not power available to travel to the target position (the case of NO in step S111).

In step S112, the CPU 20A executes second power saving processing. Details of the second power saving processing are described below.

Next, the flow of the first power saving processing in step S104 will be described with reference to FIG. 6.

Figure 6:
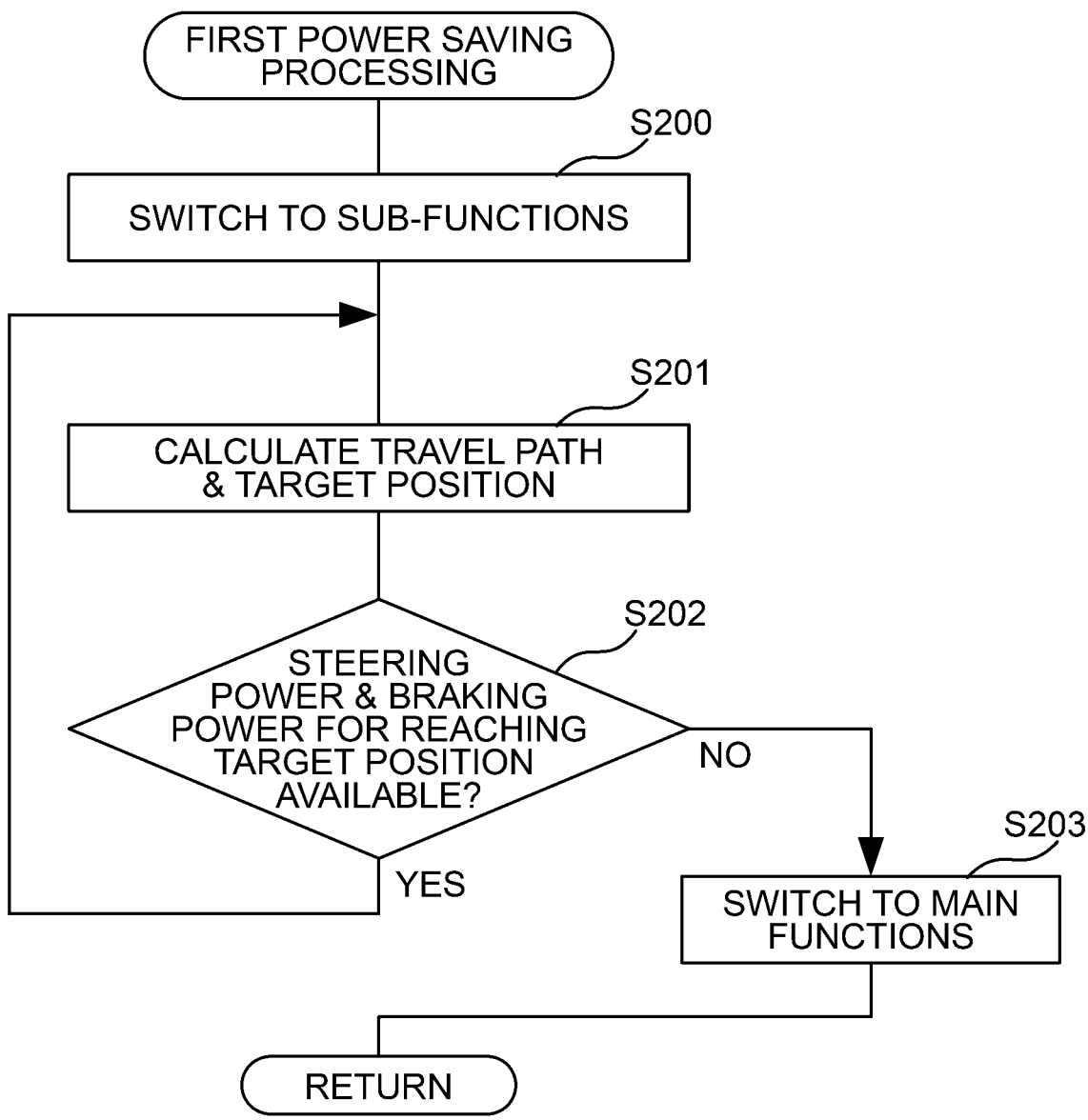
FIG. 6 is a flowchart showing the flow of first power saving processing according to the first embodiment.

In step S200 of FIG. 6, the CPU 20A executes switching to the sub-functions.

In step S201, the CPU 20A calculates a travel path and the target position.

In step S202, the CPU 20A performs a determination as to whether or not there is steering force and braking force available to enable arrival at the target position. The CPU 20A returns to step S201 in a case in which it is determined that there is steering force and braking force available to enable arrival at the target position (the case of YES in step S202). However, the CPU 20A proceeds to step S203 in a case in which it is determined that there is not steering force and braking force available to enable arrival at the target position (the case of NO in step S202).

In step S203, the CPU 20A executes switching to the main function. Then, the CPU 20A ends the first power saving processing and proceeds to step S105.

Next, the flow of the second power saving processing in step S112 will be described with reference to FIG. 7.

Figure 7:
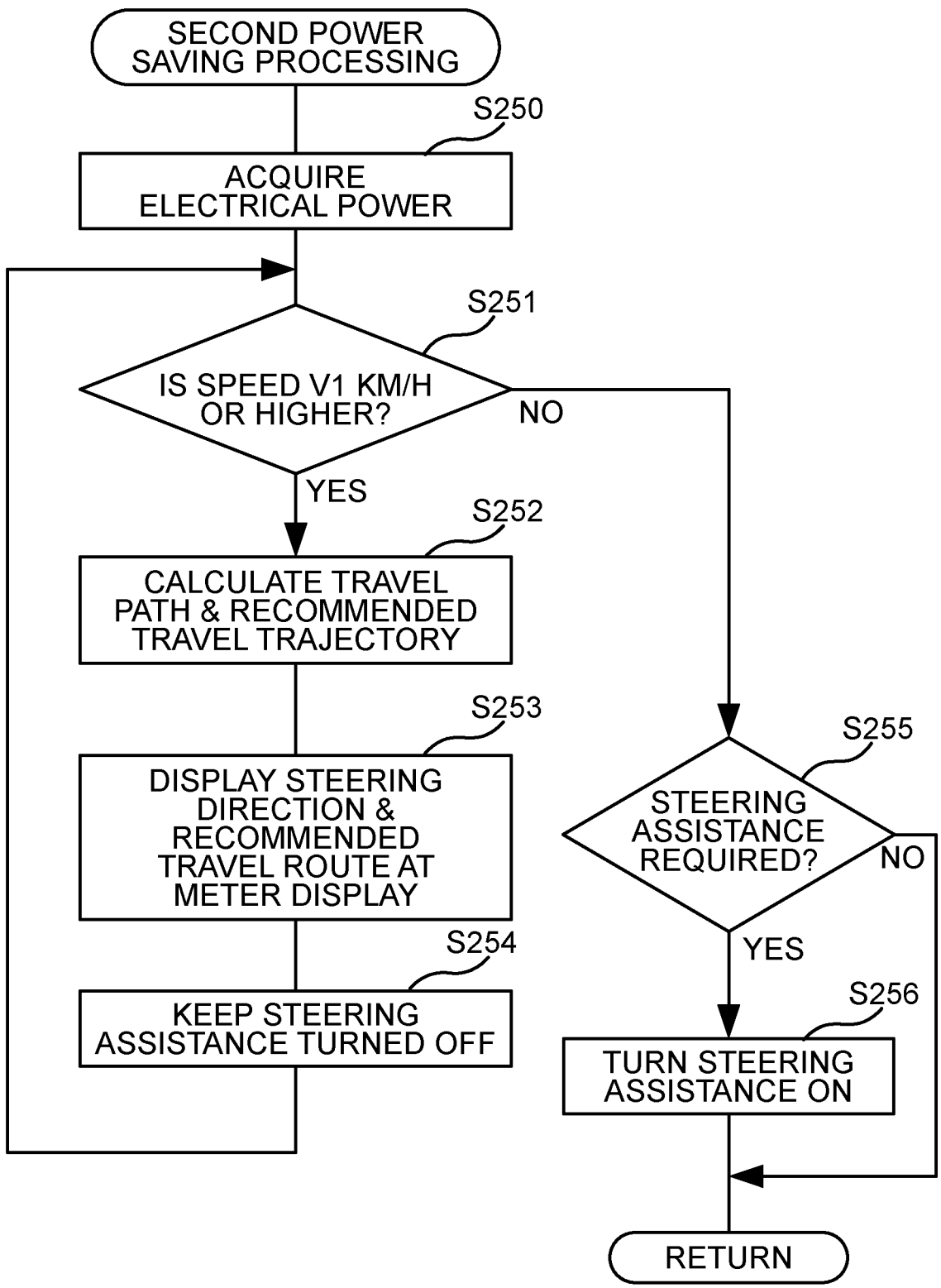
FIG. 7 is a flowchart showing the flow of second power saving processing in the first embodiment.

In step S250 of FIG. 7, the CPU 20A acquires the electrical power of the primary power source 14 and the secondary power source 16.

In step S251, the CPU 20A performs a determination as to whether or not the speed of the vehicle 12 is V1 km/h or more. The speed V1 is a speed value set in accordance with the structure, weight, and the like of the vehicle 12. The CPU 20A proceeds to step S252 in a case in which it is determined that the speed of the vehicle 12 is V1 km/h or more (the case of YES in step S251). However, the CPU 20A proceeds to step S255 in a case in which it is determined that the speed of the vehicle 12 is not V1 km/h or more (the case of NO in step S251).

In step S252, the CPU 20A calculates a travel path and a recommended travel trajectory.

In step S253, the CPU 20A displays, at the meter display 42, a recommended travel route based on the steering direction and the recommended travel trajectory.

In step S254, the CPU 20A maintains the termination of steering assistance by electric power steering. Then, the processing returns to step S251.

In step S255, the CPU 20A performs a determination as to whether or not steering assistance is required. The CPU 20A proceeds to step S256 in a case in which it is determined that steering assistance is required (the case of YES in step S255). However, the CPU 20A ends the second power saving processing and, further, ends the pull-over processing in a case in which it is determined that steering assistance is not required (the case of NO in step S255).

In step S256, the CPU 20A turns steering assistance on. Then, the second power saving processing is ended.

Figure 8:
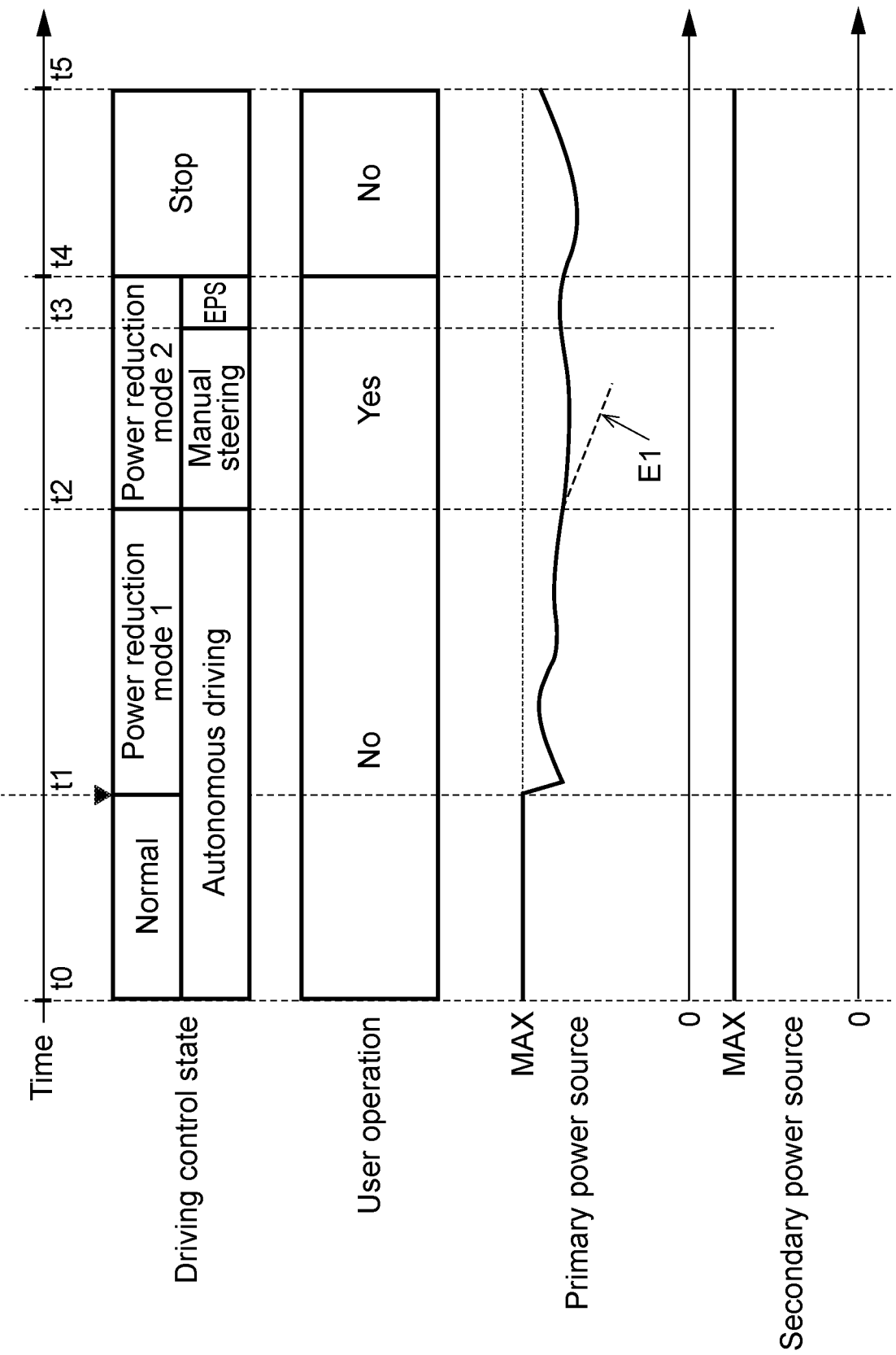
FIG. 8 is a diagram illustrating changes in time series in the pull-over processing of the first embodiment.

Next, FIG. 8 exemplifies time-series changes in the control of the vehicle 12 due to the pull-over processing of the present embodiment. As shown in FIG. 8, in the vehicle 12 that is being autonomous driven from time t0, an anomaly occurs in the primary power source 14 and the voltage drops at time t1. In this case, the integrated control ECU 20 notifies the driver that there is an anomaly in the power source. Further, the driving control state shifts from a normal state to the power reduction mode 1. As a result, the first power saving processing is executed (see step S104). As a result of execution of the first power saving processing, the braking function and the steering function of the vehicle 12 transition to the sub-functions with lower power consumption.

When the steering force and braking force towards the target position are insufficient in the case of autonomous driving by the sub-functions, the braking function and steering function of the vehicle 12 transition back to the main functions with higher power consumption (see steps S202 and S203). Then, in a case in which the notification of the anomaly, which has been executed from the time t1, has continued for a preset time (see step S106), at time t2, autonomous driving transitions to manual driving, and further, the driving control state shifts from the power reduction mode 1 to the power reduction mode 2. As a result, the second power saving processing is executed (see step S112). Where the voltage of the primary power source 14 would drop further if the power reduction mode 1 were to be maintained (see arrow E1 in FIG. 8), by switching to the power reduction mode 2, steering assistance of the vehicle 12 is turned off.

Further, in a case in which the driving control state is the power reduction mode 2 and the speed of the vehicle 12 becomes less than V1 km/h at time t3 (the case of NO in step S251), and in a case in which it is determined that steering assistance is required (the case of YES in step S255), the steering assistance that was off is turned on. As a result, the steering force dependent on steering operation by the driver is reduced, and at time t4, the driver can safely stop the vehicle 12. Then, at time t5, for example, it is possible to take measures such as notifying the dealer of the failure, from the integrated control ECU 20 via a network external to the vehicle 12. That is, in a case in which the vehicle 12 has been stopped in the power reduction mode 1 or the power reduction mode 2, the integrated control ECU 20 notifies a device outside the vehicle 12 of the failure.

Next, FIGS. 9 to 12 illustrate the operation of the vehicle 12 during autonomous driving according to the pull-over processing.

Figure 9:
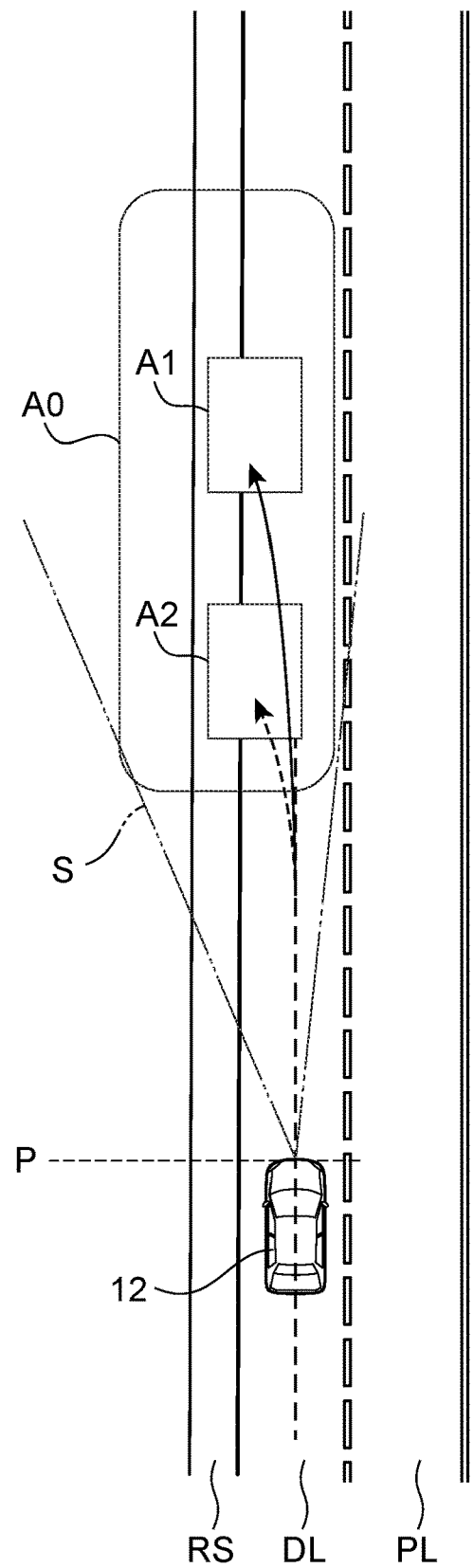
FIG. 9 is a diagram showing an example of operation of the vehicle during autonomous driving in the pull-over processing of the first embodiment.

First, FIG. 9 shows an example of pulling over to the road shoulder RS in a case in which an anomaly has occurred in the primary power source 14 while traveling in a driving lane DL of a two-lane straight road. As shown in FIG. 9, in a case in which an anomaly has occurred in the primary power source 14 at point P, the integrated control ECU 20 transitions the driving control state from normal to the power reduction mode 1, and switches to sub-functions in the first power saving processing (see step S200).

At this time, the integrated control ECU 20 sets a target position in a pull-over area A0 included in a recognition area S recognized by the external sensor 18. Then, the integrated control ECU 20 utilizes the sub-functions to pull the vehicle 12 over with, in the pull-over area A0, a pull-over position A1 established at the road shoulder RS as the target position. As a result, the vehicle 12 is stopped with gentle steering and braking while suppressing the reduction in electrical power.

However, in a case in which the steering force and braking force for moving toward the pull-over position A1 are insufficient, the integrated control ECU 20 executes switching from the sub-functions to the main functions in the first power saving processing (see step S202 and step S203). Then, the integrated control ECU 20 utilizes the main functions to pull the vehicle 12 over with, in the pull-over area A0, a pull-over position A2 established at the road shoulder RS as the target position. As a result, the vehicle 12 can be stopped before electrical power is entirely depleted.

Figure 10:
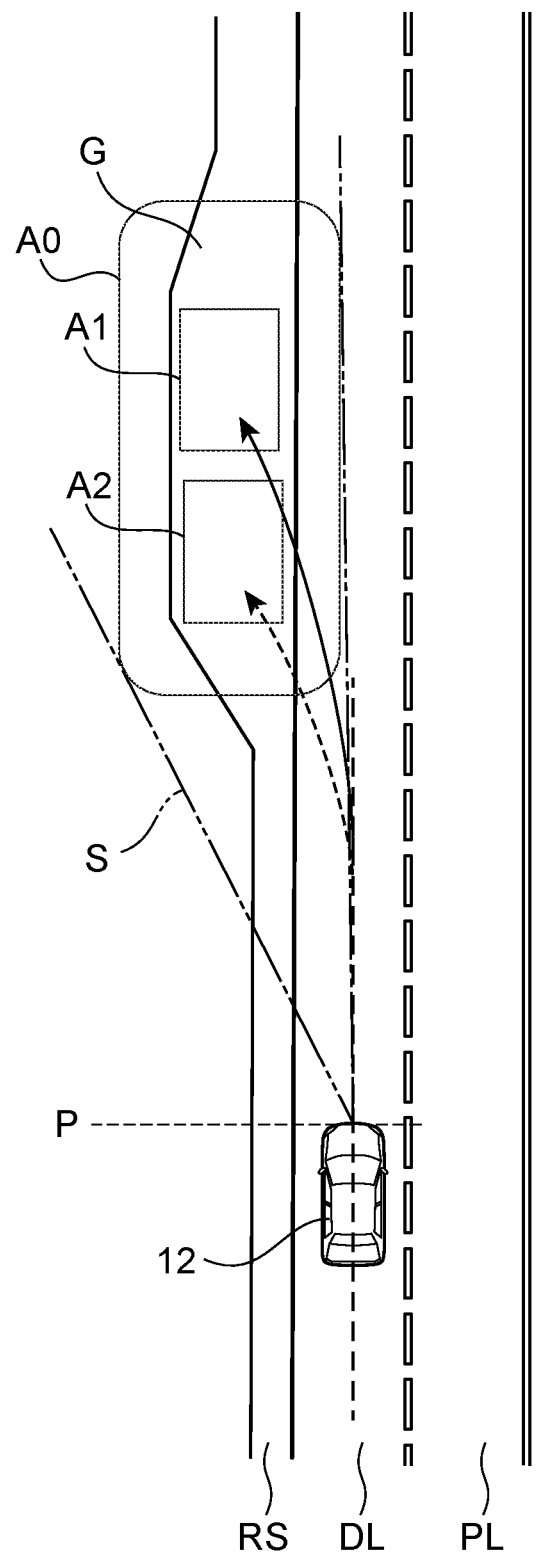
FIG. 10 is a diagram showing an example of operation of the vehicle during autonomous driving in the pull-over processing of the first embodiment.

Next, FIG. 10 shows an example of pulling over to a roadside strip G in a case in which an anomaly has occurred in the primary power source 14 while traveling in a driving lane DL of a two-lane straight road. As shown in FIG. 10, in a case in which an anomaly has occurred in the primary power source 14 at point P, the integrated control ECU 20 transitions the driving control state from normal to the power reduction mode 1, and switches to sub-functions in the first power saving processing (see step S200).

At this time, the integrated control ECU 20 sets a target position in a pull-over area A0 included in a recognition area S recognized by the external sensor 18. Then, the integrated control ECU 20 utilizes the sub-functions to pull the vehicle 12 over with, in the pull-over area A0, a pull-over position A1 established at the roadside strip G as the target position. As a result, the vehicle 12 is stopped with gentle steering and braking while suppressing the reduction in electrical power.

However, in a case in which the steering force and braking force for moving toward the pull-over position A1 are insufficient, similarly to the example in FIG. 9, the integrated control ECU 20 utilizes the main functions to pull the vehicle 12 over with, in the pull-over area A0, a pull-over position A2 established at the roadside strip G as the target position. As a result, the vehicle 12 can be stopped before electrical power is entirely depleted.

Figure 11:
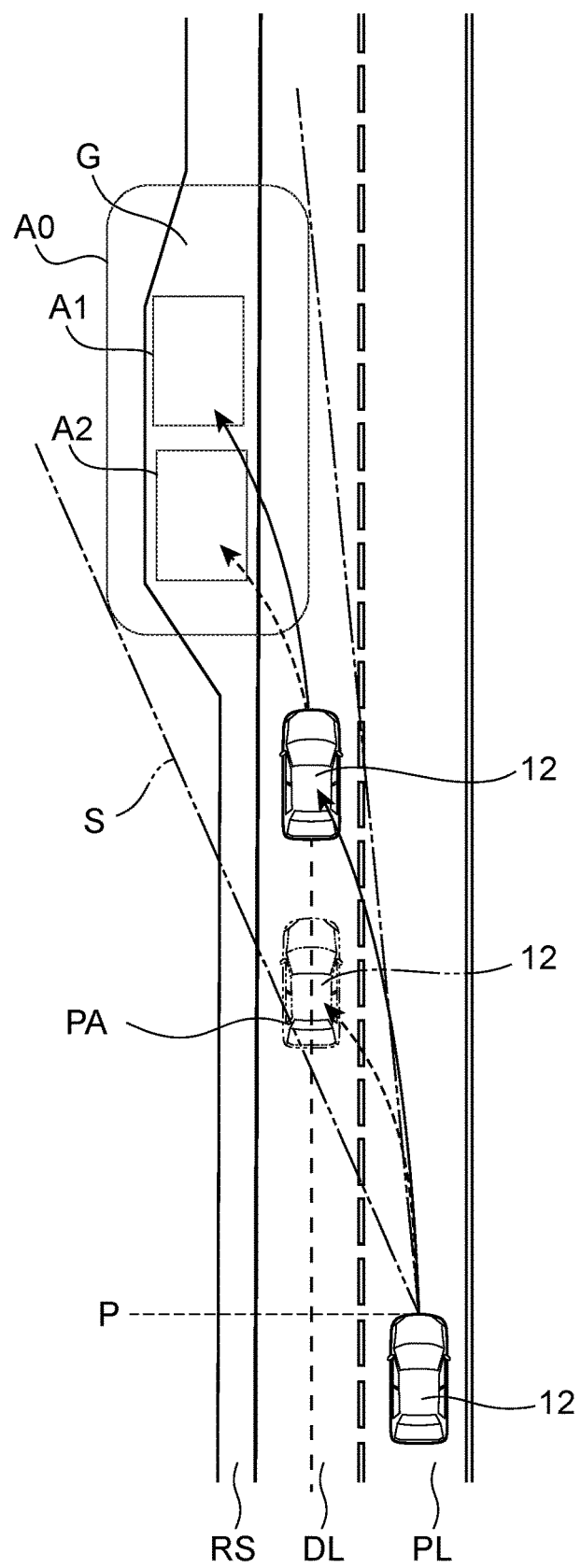
FIG. 11 is a diagram showing an example of operation of the vehicle during autonomous driving in the pull-over processing of the first embodiment.

Next, FIG. 11 shows an example of pulling over to a roadside strip G in a case in which an anomaly has occurred in the primary power source 14 while traveling in a passing lane PL of a two-lane straight road. As shown in FIG. 11, in a case in which an anomaly has occurred in the primary power source 14 at point P, the integrated control ECU 20 transitions the driving control state from normal to the power reduction mode 1, and switches to sub-functions in the first power saving processing (see step S200).

At this time, the integrated control ECU 20 sets a target position in a pull-over area A0 included in a recognition area S recognized by the external sensor 18. Then, the integrated control ECU 20 utilizes the sub-functions to pull the vehicle 12 over with, in the pull-over area A0, a pull-over position A1 established at the roadside strip G as the target position, while changing lanes to the driving lane DL. In a case in which the main functions are used, the vehicle 12 can quickly change lanes to the driving lane DL (see point PA); however, there is a possibility that power will become insufficient prior to arrival at the pull-over area A0. However, by means of autonomous driving by the sub-functions, the vehicle 12 can be stopped at the pull-over position A1 by gentle steering and braking while suppressing the reduction in electrical power.

However, in a case in which the steering force and braking force for moving toward the pull-over position A1 while traveling in the driving lane DL are insufficient, similarly to the example in FIG. 10, the integrated control ECU 20 utilizes the main functions to pull the vehicle 12 over with, in the pull-over area A0, a pull-over position A2 established at the roadside strip G as the target position. As a result, the vehicle 12 can be stopped before electrical power is entirely depleted.

The integrated control ECU 20 may control each drive device 50 so as to minimize the total value of the electrical power required to change the lane from the passing lane PL to the driving lane DL and the electrical power required to pull the vehicle 12 over to the pull-over area A0.

Figure 12:
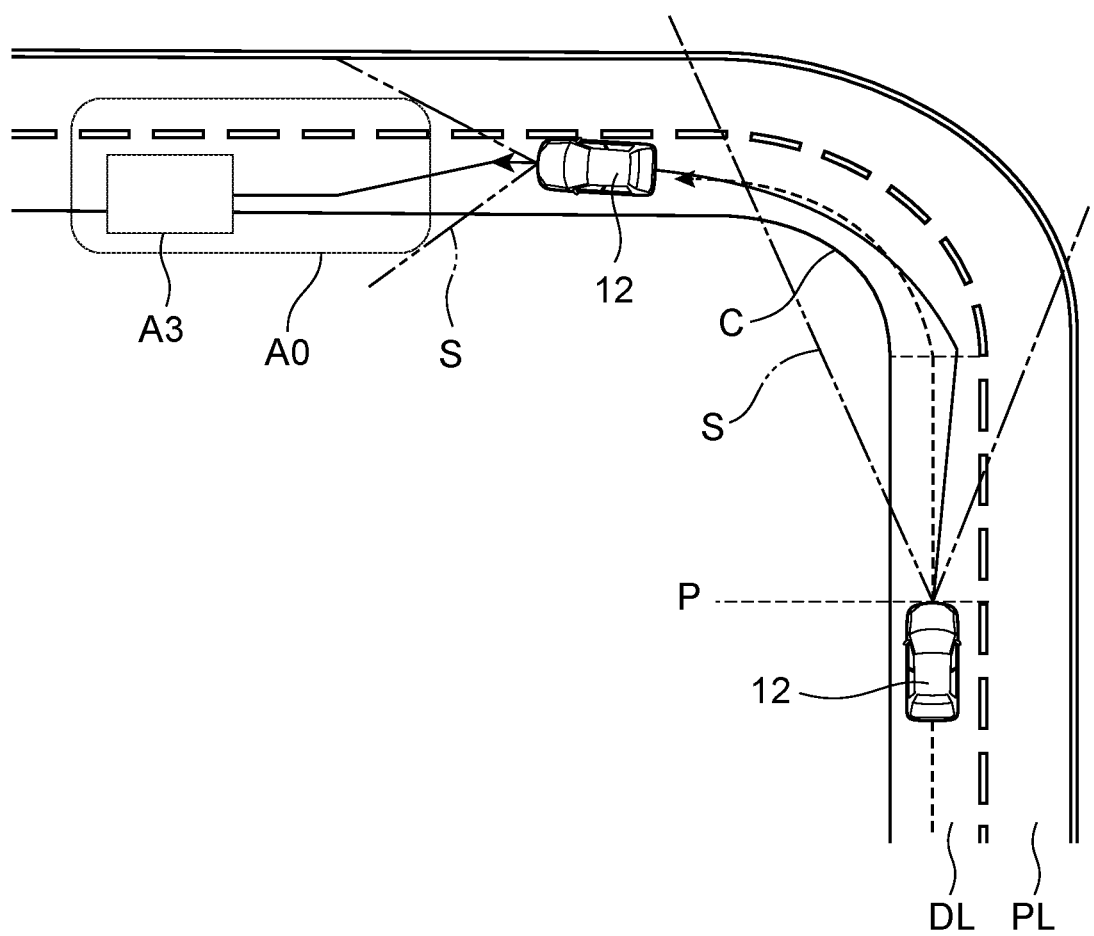
FIG. 12 is a diagram showing an example of operation of the vehicle during autonomous driving in the pull-over processing of the first embodiment.

Next, FIG. 12 shows an example of pulling over to the road shoulder RS in a case in which an anomaly has occurred in the primary power source 14 while traveling in a driving lane DL that is a curved road. As shown in FIG. 12, in a case in which an anomaly has occurred in the primary power source 14 at point P, the integrated control ECU 20 transitions the driving control state from normal to the power reduction mode 1, and switches to sub-functions in the first power saving processing (see step S200).

At this time, the integrated control ECU 20 attempts to set the pull-over area A0 in the recognition area S recognized by the external sensor 18. However, since it is dangerous for the vehicle 12 to stop on the curve C of the driving lane DL, a temporary target position is set past the curve C.

Then, when traveling on the curve C by means of the sub-functions, the integrated control ECU 20 moves the vehicle 12 to an outer side before the curve C, thereby reducing the steering angle on the curve C to compensate for the decrease in steering force due to the sub-functions. However, if the curvature of the curve C is large and it is not possible to turn by steering with the sub-functions, the integrated control ECU 20 may steer the vehicle 12 by temporarily activating the electric power steering; that is, by turning on the steering assistance.

The integrated control ECU 20 sets a target position in a pull-over area A0 included in a recognition area S recognized by the external sensor 18, subsequent to passage through the curve C. Then, the integrated control ECU 20 utilizes the sub-functions to pull the vehicle 12 over with, in the pull-over area A0, a pull-over position A3 established past the curve C as the target position. According to autonomous driving by means of the sub-functions, the vehicle 12 can be stopped at the pull-over position A3 by gentle steering and braking while suppressing the reduction in electrical power during passage through the curve C.

In a case in which the steering force and braking force for passing through the curve C are insufficient prior to the curve C, the integrated control ECU 20 uses the main functions to stop the vehicle 12 as far before the curve C as possible. As a result, it is possible to avoid stopping within the curve C, where visibility is poor, and to stop the vehicle 12 before electrical power is depleted.

Summary of the Embodiment

The integrated control ECU 20 of the present embodiment is applied in a case of controlling a vehicle 12 equipped with plural drive devices 50 capable of controlling deceleration and steering, and with a primary power source 14 and a secondary power source 16 for supplying electrical power to these drive devices 50. In the integrated control ECU 20 of the present embodiment, control of the vehicle 12 by the drive devices 50 with a higher power consumption amount is executed by the main functions, and control of the vehicle 12 by the drive devices 50 with a lower power consumption amount is executed by the sub-functions. That is, although the main functions can secure a larger steering force and braking force as compared to the sub-functions, electrical power consumption is higher.

In the present embodiment, the monitoring unit 200 monitors for anomalies in the primary power source 14 and the secondary power source 16 and, at the same time, in a case in which the control unit 220 detects an anomaly in at least one of the primary power source 14 or the secondary power source 16, the vehicle 12 is controlled by switching from the main functions to the sub-functions. According to the present embodiment, in the vehicle 12 provided with plural power sources, even in a case in which at least one of the power sources fails, it is possible to secure electrical power for safely pulling the vehicle 12 over.

Further, in the integrated control ECU 20 of the present embodiment, in a case in which the steering force and braking force for stopping at the estimated stopping target are insufficient during control of the vehicle 12 by the sub-functions, the vehicle 12 is controlled by switching to the main functions. Therefore, according to the present embodiment, in a case in which the steering force and braking force according to the sub-functions are insufficient, by switching to the main functions, it is possible to secure steering force and braking force for stopping at the stopping target. In a case in which a sudden interruption occurs in front of the vehicle 12 while the vehicle 12 is traveling according to the sub-functions, and in a case in which there is a sudden road incursion by a pedestrian or the like, it is possible to avoid danger by immediately switching to the main functions.

Further, as the speed of the vehicle 12 decreases, a larger steering force is required, and according to the present embodiment, it is possible to secure the steering force in a case in which the speed of the vehicle 12 falls below the predetermined value V1 km/h.

Further, in the integrated control ECU 20 of the present embodiment, in a case in which the vehicle 12 is controlled by the sub-functions, guidance for the vehicle 12 is provided to the driver via the meter display 42. According to the present embodiment, even in a case in which the steering force and braking force are insufficient, it is possible to guide the driver driving the vehicle 12 along a safe pull-over path.

Second Embodiment

In the first embodiment, pull-over processing in a case in which an anomaly has occurred in the primary power source 14 has been exemplified; however, in the second embodiment, pull-over processing in a case in which an anomaly has occurred in both the primary power source 14 and the secondary power source 16 is exemplified. Explanation follows regarding points of difference from the first exemplary embodiment. The same reference numerals are assigned to identical configurations, and detailed description thereof is omitted.

(Control flow)

The flow of the pull-over processing executed at the integrated control ECU 20 of the present embodiment is explained with reference to the flowcharts of FIGS. 13 and 14.

Figure 13:
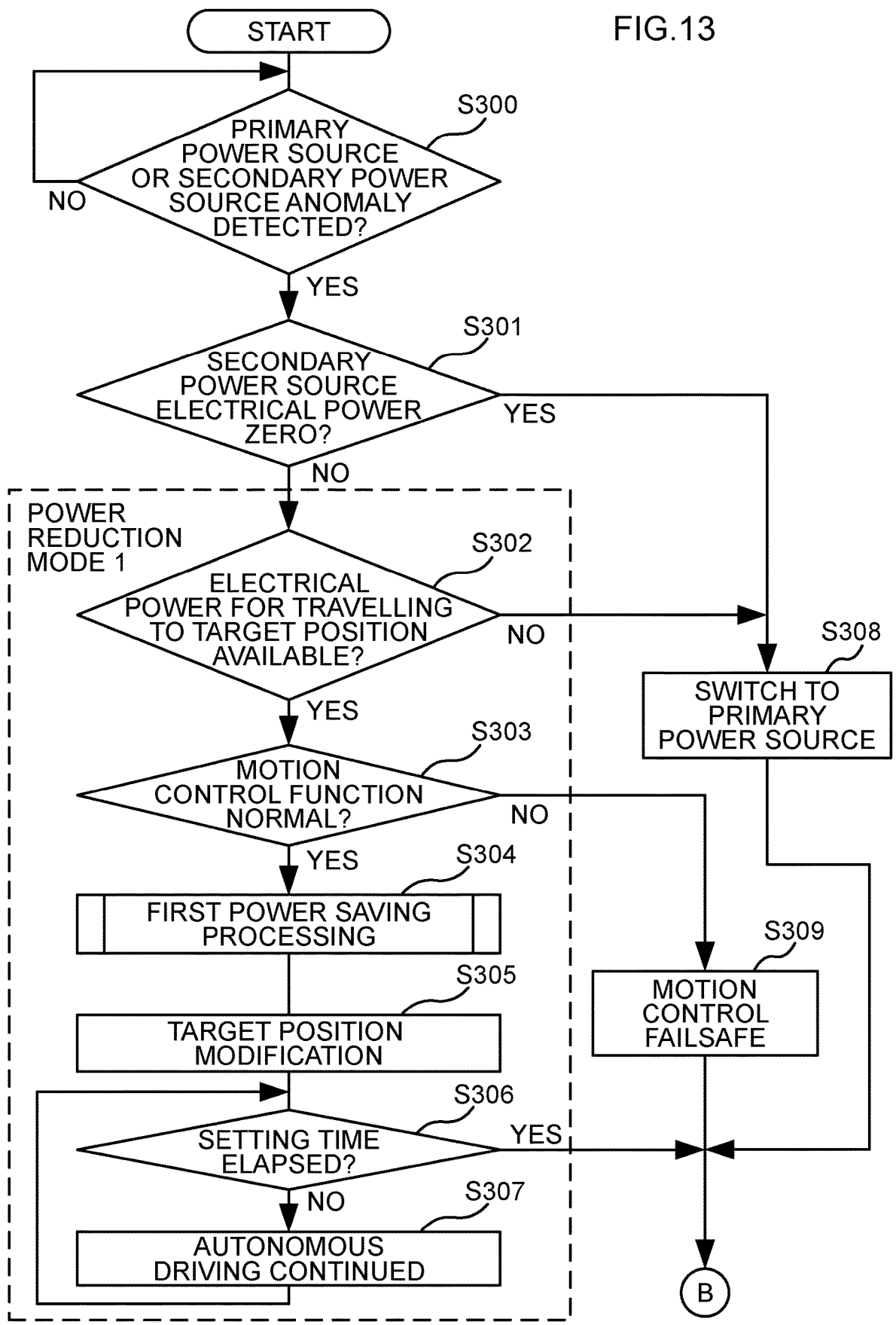
FIG. 13 is a flowchart showing the flow of pull-over processing in a second embodiment.

In step S300 of FIG. 13, the CPU 20A performs a determination as to whether or not an anomaly has been detected in the primary power source 14 and/or the secondary power source 16. The CPU 20A proceeds to step S301 in a case in which it is determined that an anomaly has been detected in the primary power source 14 and/or the secondary power source 16 (the case of YES in step S300). However, the CPU 20A repeats step S300 in a case in which it is determined that an anomaly has not been detected in the primary power source 14 and/or the secondary power source 16 (the case of NO in step S300).

In step S301, the CPU 20A performs a determination as to whether or not the power of the secondary power source 16 is zero. The CPU 20A proceeds to step S308 in a case in which it is determined that the power of the secondary power source 16 is zero (the case of YES in step S301). However, the CPU 20A proceeds to step S302 in a case in which it is determined that the power of the secondary power source 16 is not zero (the case of NO in step S301).

Here, from step S302 to step S307, the processing is executed as "power reduction mode 1". Further, the processing from step S302 to step S307 is similar to the steps from step S102 to step S107 of the first embodiment. The details of the first power saving processing in step S304 are as described above. In step S306, the CPU 20A proceeds to step S310 of FIG. 14 via a reference symbol B in a case in which it is determined that a setting time has elapsed (the case of YES in step S306).

In step S308, the CPU 20A executes switching to the primary power source 14. Then, the processing proceeds to step S310 of FIG. 14 via the reference symbol B.

In step S309, the CPU 20A executes a fail-safe for motion control of the vehicle 12. Then, the processing proceeds to step S310 of FIG. 14 via the reference symbol B.

Figure 14:
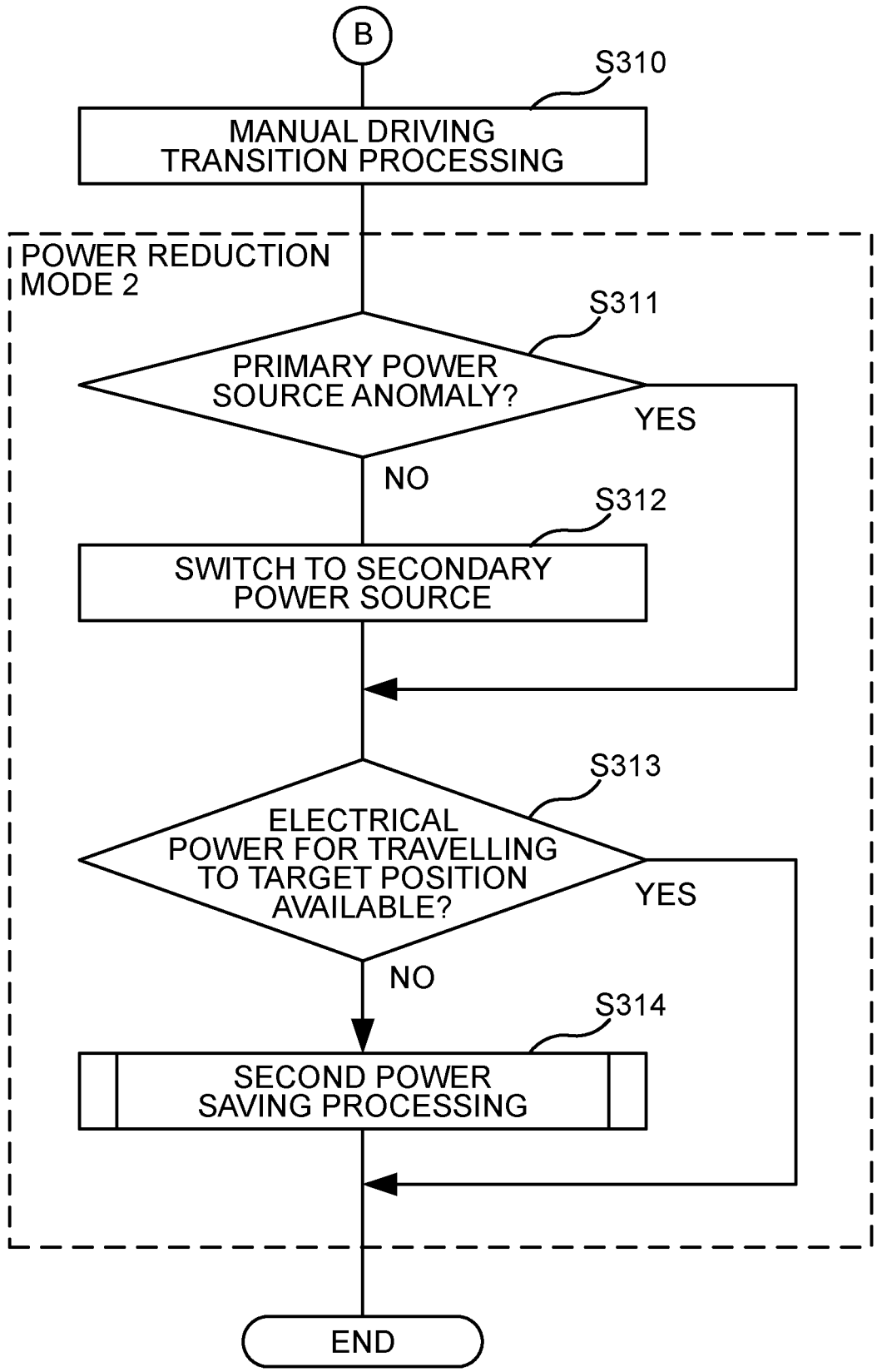
FIG. 14 is a flowchart (the continuation of FIG. 13) showing the flow of the pull-over processing in the second embodiment.

In step S310 of FIG. 14, the CPU 20A executes processing for transitioning to manual driving.

Here, from step S311 to step S314, the processing is executed as "power reduction mode 2".

In step S311, the CPU 20A performs a determination as to whether or not an anomaly has been detected in the primary power source 14. The CPU 20A proceeds to step S313 in a case in which it is determined that an anomaly has been detected in the primary power source 14 (the case of YES in step S311). However, the CPU 20A proceeds to step S312 in a case in which it is determined that an anomaly has not been detected in the primary power source 14 (the case of NO in step S311).

In step S312, the CPU 20A executes switching to the secondary power source 16.

In step S313, the CPU 20A performs a determination as to whether or not electrical power for traveling to the target position is available. The CPU 20A ends the pull-over processing in a case in which it is determined that there is power available to travel to the target position (the case of YES in step S313). However, the CPU 20A proceeds to step S314 in a case in which it is determined that there is not power available to travel to the target position (the case of NO in step S313).

In step S314, the CPU 20A executes the second power saving processing. The details of the second power saving processing are as described above.

Figure 15:
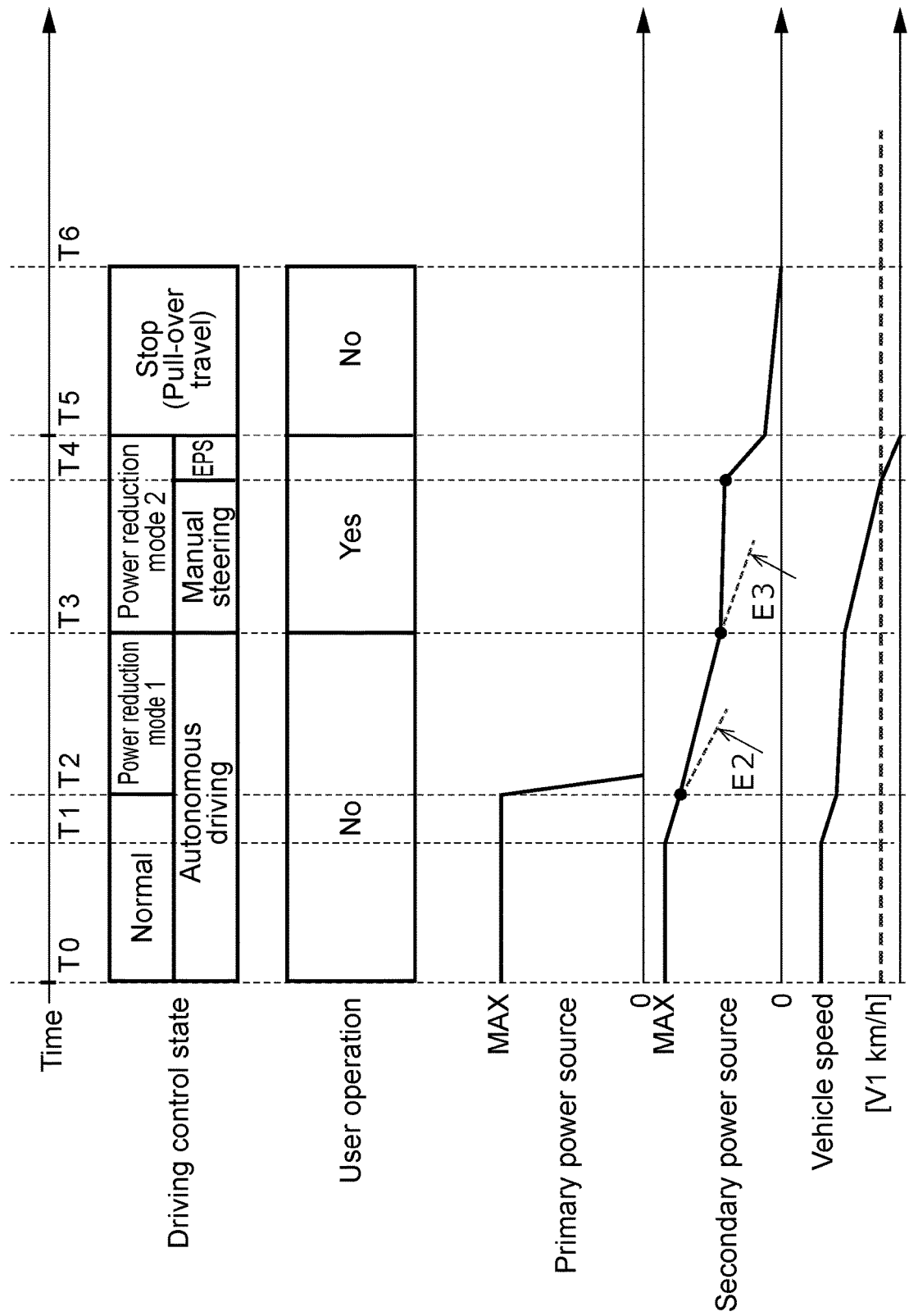
FIG. 15 is a diagram illustrating changes in time series in the pull-over processing of the second embodiment.

FIG. 15 exemplifies time-series changes in the control of the vehicle 12 due to the pull-over processing of the present embodiment. As shown in FIG. 15, in the vehicle 12 that is being autonomous driven from time T0, an anomaly occurs in the secondary power source 16 and the voltage drops at time T1. In this case, the integrated control ECU 20 notifies the driver that there is an anomaly in the power source. Further, the secondary power source 16 is shut off and the autonomous driving is continued only by means of the primary power source 14. At time T2, a further anomaly occurs in the primary power source 14 and the voltage drops sharply; in other words, there is a failure. In this case, the driving control state transitions from the normal state to the power reduction mode 1. As a result, the first power saving processing is executed (see step S304). By executing the first power saving processing, the braking function and steering function of the vehicle 12 transition to sub-functions with lower power consumption amounts. Where the voltage of the secondary power source 16 would drop further if the main functions were to be maintained (see arrow E2 in FIG. 15), by transitioning to the sub-functions, the voltage drop of the secondary power source 16 is suppressed.

However, when the steering force and braking force towards the target position are insufficient in the case of autonomous driving by the sub-functions, the braking function and steering function of the vehicle 12 transition back to the main functions with higher power consumption (see step S202 and step S203). Then, in a case in which the notification of the anomaly, which has been executed from the time T1, has continued for a preset time (see step S306), at time T3, autonomous driving transitions to manual driving, and further, the driving control state shifts from the power reduction mode 1 to the power reduction mode 2. As a result, the second power saving processing is executed (see step S314). Where the voltage of the primary power source 14 would drop further if the power reduction mode 1 were to be maintained (see arrow E3 in FIG. 15), by switching to the power reduction mode 2, steering assistance of the vehicle 12 is turned off.

Further, in a case in which the driving control state is the power reduction mode 2 and the speed of the vehicle 12 becomes less than V1 km/h at time T4 (the case of NO in step S251), and in a case in which it is determined that steering assistance is required (the case of YES in step S255), the steering assistance that was off is turned on. As a result, the steering force dependent on steering operation by the driver is reduced, and at time T5, the driver can safely stop the vehicle 12. Then, at time T6, for example, it is possible to take measures such as notifying the dealer of the failure, from the integrated control ECU 20 via a network external to the vehicle 12. That is, in a case in which the voltages of the primary power source 14 and the secondary power source 16 have become 0 (that is, the power sources are lost), the integrated control ECU 20 notifies a device outside the vehicle 12 of the failure.

Figure 16:
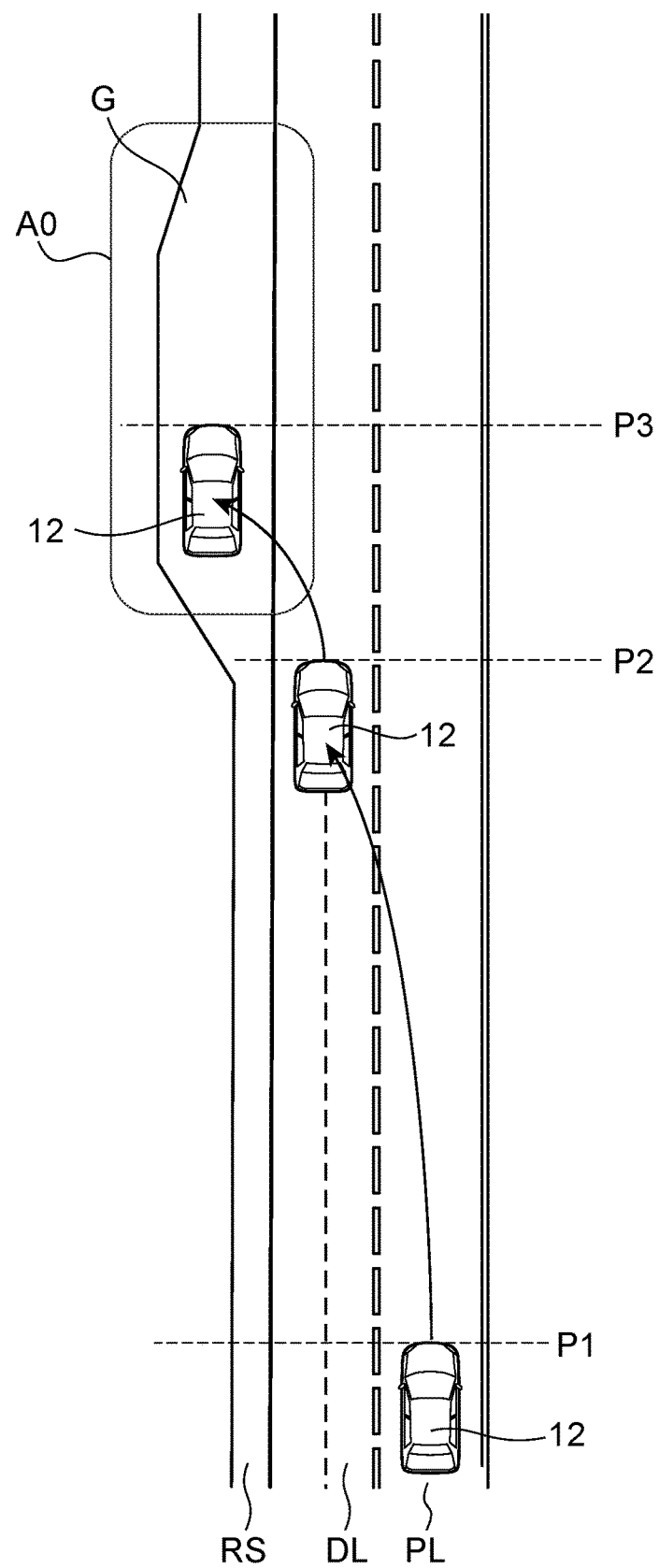
FIG. 16 is a diagram showing an example of operation of the vehicle during manual driving in the pull-over processing of the second embodiment.

Next, FIG. 16 illustrates the operation of the vehicle 12 during manual driving in accordance with the pull-over processing of the present embodiment.

FIG. 16 shows an example of pulling over to the roadside strip G when an anomaly occurs in the primary power source 14 and the secondary power source 16 while traveling in the passing lane PL on a straight road with two lanes.

As shown in FIG. 16, an anomaly occurs in the primary power source 14 and the secondary power source 16 at the point P1, and the driving control state transitions to the power reduction mode 2, whereby travel control of the vehicle 12 by the sub-functions is executed. In this case, the integrated control ECU 20 provides, via the meter display 42, guidance to decelerate and steer the vehicle 12 with respect to the driver. As a result, the driver is notified that the braking responsiveness is weak and the steering is heavy, and by operation by the driver in accordance with the guidance, the vehicle 12 achieves a smooth lane change from the passing lane PL to the driving lane DL.

Further, in a case in which the speed of the vehicle 12 has fallen below V1 km/h at the point P2, the integrated control ECU 20 turns on the steering assistance and activates the electric power steering with the remaining electrical power (see step S256). As a result, the driver can stop the vehicle 12 in the roadside strip G, which is the pull-over area A0.

According to the second embodiment configured as described above, similar effects to those of the first embodiment described above can be realized.

[Notes]

In the first embodiment, a case was exemplified in which, as shown in FIG. 8, the secondary power source 16 is normal and an anomaly has occurred in the primary power source 14; however, the opposite case is also possible. That is, in a case in which when the primary power source 14 is normal and an anomaly has occurred in the secondary power source 16, similar processing is achieved by switching the primary power source 14 and the secondary power source 16 in the pull-over processing.

Further, in the second embodiment, a case was exemplified in which the primary power source 14 fails after an anomaly occurs in the secondary power source 16; however, the opposite case is also possible. That is, in a case in which the secondary power source 16 fails after an anomaly occurs in the primary power source 14, similar processing is achieved by switching the primary power source 14 and the secondary power source 16 in the pull-over processing.

Further, in the above-described embodiments, any of various types of processors other than the CPU 20A may execute the processing that the CPU 20A executes by reading out software (programs). Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, each processing described above may be executed by one of these various types of processors, or may be executed by combining two or more of the same type or different types of processors (e.g., plurals FPGAs, or a combination of a CPU and an FPGA, or the like). Further, a hardware configuration of the various processors is specifically formed as an electric circuit combining circuit elements such as semiconductor element.

Moreover, in the exemplary embodiments described above, cases have been described in which each of the programs is pre-stored (pre-installed) on a non-transitory computer readable recording medium. For example, the control program 100 in the integrated control ECU 20 is stored in the ROM 20B in advance. However, there is no limitation thereof, and the respective programs may be provided in a format stored on a non-transitory recording medium such as a Compact Disc Read Only Memory (CD-ROM), Digital Versatile Disc Read Only Memory (DVD-ROM), or Universal Serial Bus (USB) memory. Alternatively, these programs may be provided in a format downloaded from an external device through a network.

The processing flows described in the above exemplary embodiment are merely examples thereof, and unnecessary steps may be omitted, new steps added, or the processing sequence changed within a range not departing from the spirit thereof.

What is claimed is:

1. A vehicle control device, comprising a processor, the processor being configured to:
monitor a primary power source and a secondary power source for anomalies, the primary power source and the secondary power source supplying electrical power to a plurality of drive devices configured to control deceleration and steering of a vehicle; and in a case in which an anomaly has been detected in at least one of the primary power source or the secondary power source as a result of the monitoring during autonomous driving of the vehicle:

estimate a stopping target for the vehicle, control the vehicle by supplying electrical power to a drive device having a lower electrical power consumption amount among the plurality of drive devices, control the vehicle by switching to a drive device having a higher electrical power consumption amount in a case in which steering power and braking power are insufficient for stopping at the stopping target during control of the vehicle by the drive device having the lower electrical power consumption amount, and notify switching from the autonomous driving to manual driving, and switch to manual driving after a setting time has elapsed, the setting time being a predetermined period of time greater than zero after notifying switching from the autonomous driving to the manual driving.

2. The vehicle control device recited in claim 1, wherein the processor is further configured to control the vehicle by switching a drive device of a steering system to a drive device having a higher electrical power consumption amount in a case in which a velocity of the vehicle has fallen below a predetermined value.

3. The vehicle control device recited in claim 1, wherein the processor is further configured to perform guidance of the vehicle with respect to a driver of the vehicle in a case in which the processor is controlling the vehicle by means of the drive device having a lower electrical power consumption amount.

4. The vehicle control device recited in claim 1, wherein the processor is further configured to notify a source external to the vehicle of a failure in a case in which the processor has controlled the vehicle by means of the drive device having a lower electrical power consumption amount and the vehicle has stopped.

5. The vehicle control device recited in claim 1, wherein the processor is further configured to notify a source external to the vehicle of a failure in a case in which a voltage of both the primary power source and the secondary power source is zero.

6. A vehicle, comprising:
the vehicle control device recited in claim 1,
wherein the processor is configured to control autonomous driving of the vehicle;
the primary power source;
the secondary power source; and
the plurality of drive devices.

7. The vehicle control device recited in claim 1, wherein the processor is further configured to display a recommended travel route and a steering direction to the stopping target at a meter display provided within the vehicle.

8. A method, comprising executing processing via a computer to control a vehicle, the processing comprising:

monitoring a primary power source and a secondary power source for anomalies, the primary power source and the secondary power source supplying electrical power to a plurality of drive devices configured to control deceleration and steering of the vehicle; and in a case in which an anomaly has been detected in at least one of the primary power source or the secondary power source during autonomous driving of the vehicle:

estimating a stopping target for the vehicle, controlling the vehicle by supplying electrical power to a drive device having a lower electrical power consumption amount among the plurality of drive devices, controlling the vehicle by switching to a drive device having a higher electrical power consumption amount in a case in which steering power and braking power are insufficient for stopping at the stopping target during control of the vehicle by the drive device having the lower electrical power consumption amount, and notifying switching from the autonomous driving to manual driving, and switch to manual driving after a setting time has elapsed, the setting time being a predetermined period of time greater than zero after notifying switching from the autonomous driving to the manual driving.

9. A non-transitory storage medium storing a control program executable by a computer to perform processing, the processing comprising:

monitoring a primary power source and a secondary power source for anomalies, the primary power source and the secondary power source supplying electrical power to a plurality of drive devices configured to control deceleration and steering of the vehicle; and in a case in which an anomaly has been detected in at least one of the primary power source or the secondary power source during autonomous driving of the vehicle:

estimating a stopping target for the vehicle, controlling the vehicle by supplying electrical power to a drive device having a lower electrical power consumption amount among the plurality of drive devices, controlling the vehicle by switching to a drive device having a higher electrical power consumption amount in a case in which steering power and braking power are insufficient for stopping at the stopping target during control of the vehicle by the drive device having the lower electrical power consumption amount, and notifying switching from the autonomous driving to manual driving, and switch to manual driving after a setting time has elapsed, the setting time being a predetermined period of time greater than zero after notifying switching from the autonomous driving to the manual driving.

* * * * *